J. S. HANSEN.
SHOE TREE.
APPLICATION FILED JAN. 6, 1908.
903,082.
Patented Nov. 3, 1908.
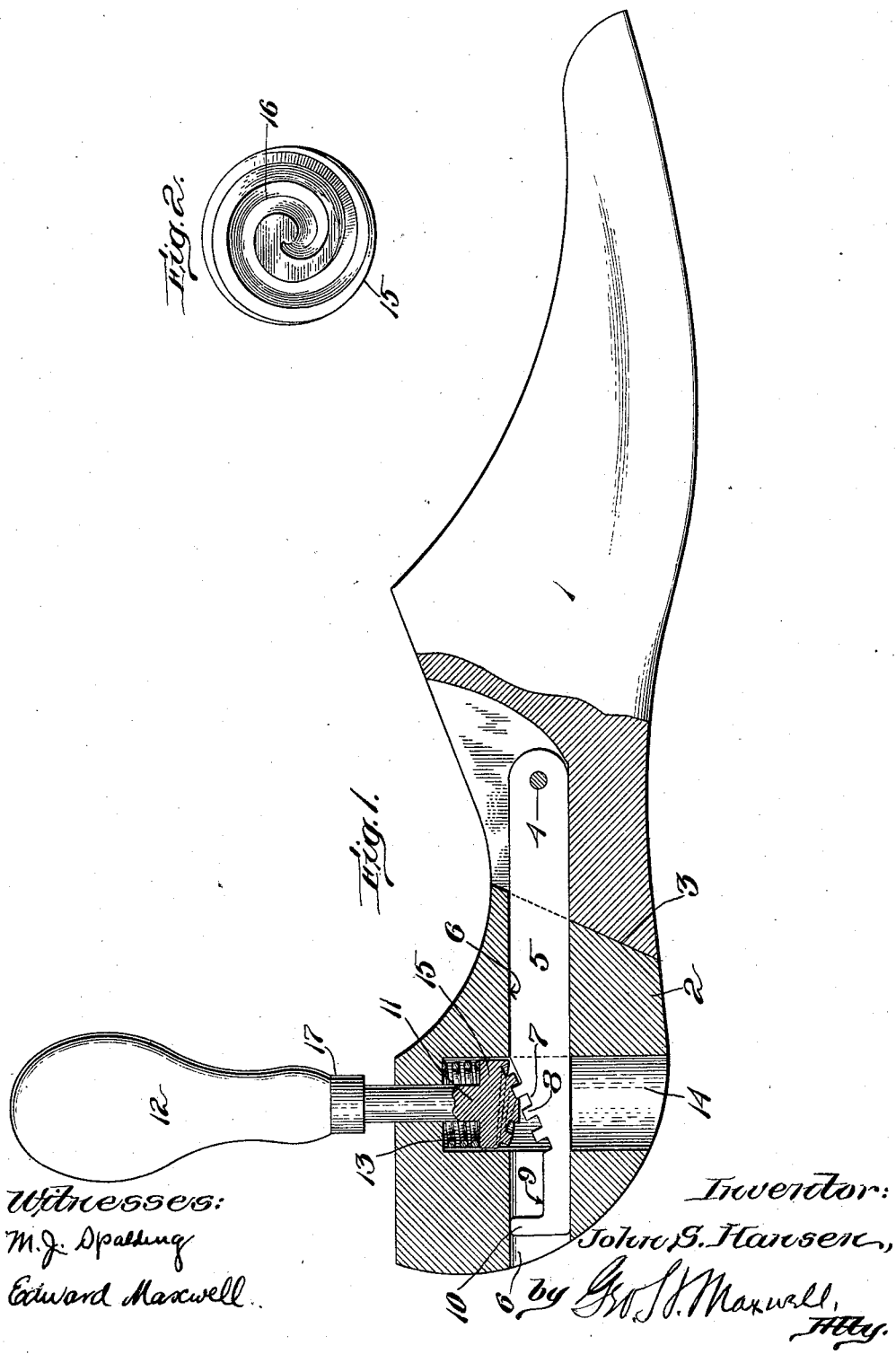
Witnesses:
M. J. Spalding
Edward Maxwell
Inventor:
John S. Hansen,
by Geo. S. Maxwell,
Atty.

UNITED STATES PATENT OFFICE.

JOHN S. HANSEN, OF BROCKTON, MASSACHUSETTS, ASSIGNOR TO O. A. MILLER TREEING MACHINE COMPANY, OF BROCKTON, MASSACHUSETTS.

SHOE-TREE.

No. 903,082.　　　Specification of Letters Patent.　　　Patented Nov. 3, 1908.

Application filed January 6, 1908. Serial No. 409,390.

*To all whom it may concern:*

Be it known that I, JOHN S. HANSEN, a citizen of the United States, and resident of Brockton, in the county of Plymouth and State of Massachusetts, have invented an Improvement in Shoe-Trees, of which the following description, in connection with the accompanying drawings, is a specification, like letters on the drawings representing like parts.

My present invention is an improvement over my patented device No. 857,055, June 18, 1907, and has for its object the provision of more compact and simplified means for expanding and contracting the last or tree, while at the same time providing capacity for a more extensive lengthening and shortening movement and convenient means for detaching the forepart and its connection from the heel-part.

With the above objects in view, I provide on the connecting bar or hinge-plate an oblique portion in the upper edge of the bar, provided with a series of teeth, and a handle coöperating with these teeth having at its lower end a conical worm or helix normally in engagement with said teeth and, when rotated, capable of engaging the teeth successively, and thereby lengthening or shortening the last to a greater extent than was possible in my above mentioned patented device. Also preferably, in my present construction, the handle stands vertically in the heel-part at all times, being capable, however, of a yielding movement away from the connecting bar to permit the latter to be pulled out of the heel-part, as the most convenient and neat-appearing means of dismembering the last or tree.

In the accompanying drawings, in which I have shown one of several preferred embodiments of my invention, Figure 1 is a view of a shoe tree in side elevation, partially sectioned to show the internal constructional details of my invention; and Fig. 2 is an under side view of the handle or handle post.

The forepart 1 and heel-part 2 may be of any style and kind of last, tree, or foot member desired, being preferably severed from each other along a straight oblique line, as indicated at 3. At a convenient part 4 in the forepart I pivot a hinge-plate or connecting bar 5, which extends rearwardly in a vertical kerf or hinge socket 6 provided therefor lengthwise in the heel-part 2. Said bar 5 has an oblique edge portion 7 provided with a series of teeth 8 and a cut-away portion 9, terminating in a hooked end or stop 10. Coöperating witn the obliquely arranged teeth 8 is a handle post 11 carrying an external handle 12 set vertically in the heel-part, being normally held down by a coiled spring 13 in engagement with the teeth 8.

For convenience, the heel-part is vertically bored at 14 from its bottom side so as to provide a suitable recess or housing for the spring 13 and post 11, the spring being first inserted and then the post, whereupon the handle 12 is driven down immovably upon the post into the position shown in Fig. 1, thereby concealing from the casual observer the means and manner of assembling and retaining the parts, and also removing from the curious the temptation to take the device apart. At its lower end the post 11 has a head 15 whose upper side forms retaining means for the spring 13, and whose lower side is approximately conical in shape and provided with a helical groove 16 for receiving and coöperating with the teeth 8 in obvious manner to cause the bar 5 to travel longitudinally in one direction or the other, according to the rotation of the handle 12. As the head 15 of the handle post is beveled or somewhat conical on its under side, and as the edge 7 of the connecting bar is correspondingly beveled or oblique, the result is that as the handle is rotated around to the right, Fig. 1, the bar 5 is propelled in the same direction, thereby expanding the tree, and as the handle rotates, the groove 16 engages successive teeth until the last or lowermost tooth is engaged and passes out at the periphery of the handle post head, at which time the latter occupies the space 9 next to the stop 10 and the tree is in its extreme lengthened position. The spring 13 has meanwhile maintained the head 15 in engagement with the connecting bar, the ferrule or shoulder 17 of the handle being at a sufficient height from the head 15 to permit of the relative movement of the head necessary to maintain said engagement. If it is desired at any time to disconnect the forepart and heel-part, the operator simply pulls up on the handle 12 so as to compress the spring 13 and hold the handle post head 15 entirely above the kerf or hinge socket 6, thereby permitting the connecting bar to be freely pulled out. To restore the parts to normal connected relation, the handle is similarly raised against its spring, and the hooked or free end of the connecting bar is slid into place as shown.

Besides the convenience of operation, my invention has the advantage of simplicity and cheapness of construction, as it requires simply the two holes 6 and 14 extending transversely of each other in the heel-part, the simple stamped plate 5 and cast or milled handle, all of which are exceedingly simple and inexpensive.

I am aware that my invention may be carried out in other details and constructional embodiments, and accordingly I wish it understood that I am not limited otherwise than as expressed in the claims.

Having described my invention, what I claim as new and desire to secure by Letters Patent, is, 1. A divided shoe tree, having separable parts, a connecting bar joining said parts provided with obliquely arranged teeth, and a vertical handle having a helical groove coöperating with said teeth.

2. A divided shoe tree, having separable parts, a connecting bar provided with an obliquely extending rack at its upper edge, a rotary handle extending vertically above said rack having a beveled lower end spirally grooved to engage said rack, and yielding means for maintaining said parts in operative relation.

3. A divided shoe tree, having separable parts, a connecting bar provided with an obliquely extending rack at its upper edge, a rotary handle extending vertically above said rack having a beveled lower end spirally grooved to engage said rack, and a spring normally holding said handle downwardly in yielding engagement with said rack.

4. A divided shoe tree, having separable parts, a connecting bar provided with an obliquely extending rack at its upper edge, and a rotary handle extending vertically above said rack having a beveled lower end spirally grooved to engage said rack, said connecting bar having its end upturned to constitute a stop for limiting the lengthening movement.

5. A divided shoe tree, having separable parts, a connecting bar provided with an obliquely extending rack at its upper edge, a rotary handle extending vertically above said rack having a beveled lower end spirally grooved to engage said rack, a spring normally holding said handle downwardly in yielding engagement with said rack, and a stop at the end of said bar in the path of the handle for limiting the lengthening movement of the tree.

6. A divided shoe tree, having separable parts, one of said parts being provided with a longitudinal slot and a handle-receiving hole extending across said slot, a connecting bar occupying said slot, a handle post occupying the portion of the hole above said bar, said handle post and bar having coöperating means for moving the latter longitudinally by movement of the former, said post being incapable of removal while the bar is in operative position, and external means for operating said handle post.

7. A divided shoe tree, having its heel-part provided with a vertical hole extending upwardly from the bottom and having a shouldered upper end within the heel-part, and with a longitudinal slot crossing said hole, a headed handle post retained in said hole, a spring held between the head of said post and said shouldered upper end, and a connecting bar occupying said slot and serving to retain said post, said bar and post being provided with coöperating operating means.

8. A divided shoe tree, having its heel-part provided with a vertical hole extending upwardly from the bottom and having a shouldered upper end within the heel-part, and with a longitudinal slot crossing said hole, a headed handle post retained in said hole, the upper end of said post extending externally above said heel-part, a shouldered handle permanently secured thereon, for rendering the handle and handle post non-removable from the heel-part, and a connecting bar occupying said slot, provided with means coöperating with the handle post for lengthening and contracting the tree.

9. A divided shoe tree, having separable parts, a connecting bar pivoted in the forepart and slidingly mounted lengthwise in the heel-part, a handle and handle-actuated operating means within the heel-part for sliding said connecting bar to contract and expand the last, and a spring for normally maintaining said parts in operative position, said spring being arranged to permit said operating means to be retracted from engagement with said bar to permit the latter to be pulled from the heel-part.

10. A divided shoe tree, having separable parts, a connecting bar pivoted in the forepart and slidingly mounted lengthwise in the heel-part, a handle and handle-actuated operating means within the heel-part for sliding said connecting bar to contract and expand the last, the connecting bar having a stop at its rear end normally in position to engage said operating means to prevent the removal of the connecting bar from the heel-part, and a spring for normally maintaining said parts in operative position, said spring being arranged to permit said operating means to be retracted from engagement with said bar to permit the latter to be pulled from the heel-part.

In testimony whereof, I have signed my name to this specification, in the presence of two subscribing witnesses.

JOHN S. HANSEN.

Witnesses:
   M. J. SPALDING,
   GEO. H. MAXWELL.